United States Patent
Jaunky et al.

(10) Patent No.: US 8,987,410 B2
(45) Date of Patent: Mar. 24, 2015

(54) TERMINAL UNSATURATED, GLYCIDOL-BASED MACROMONOMERS, POLYMERS OBTAINABLE THEREFROM, PREPARATION AND USE

(75) Inventors: Wojciech Jaunky, Wesel (DE); Albert Frank, Xanten (DE); Alfred Bubat, Wesel (DE); Jürgen Omeis, Dorsten-Lembeck (DE)

(73) Assignee: BYK-Chemie GmbH (DE)

( * ) Notice: Subject to any disclaimer, the term of this patent is extended or adjusted under 35 U.S.C. 154(b) by 614 days.

(21) Appl. No.: 13/379,303

(22) PCT Filed: Jun. 4, 2010

(86) PCT No.: PCT/EP2010/003387
§ 371 (c)(1),
(2), (4) Date: Mar. 19, 2012

(87) PCT Pub. No.: WO2010/145761
PCT Pub. Date: Dec. 23, 2010

(65) Prior Publication Data
US 2012/0165414 A1  Jun. 28, 2012

(30) Foreign Application Priority Data

Jun. 19, 2009  (EP) .................................... 09008128

(51) Int. Cl.

| | | |
|---|---|---|
| C07C 231/12 | (2006.01) | |
| C07C 41/03 | (2006.01) | |
| C07C 233/20 | (2006.01) | |
| C07C 43/178 | (2006.01) | |
| C08G 65/26 | (2006.01) | |
| C08G 65/00 | (2006.01) | |
| C08G 65/22 | (2006.01) | |

(52) U.S. Cl.
CPC ............ C08G 65/2609 (2013.01); C08G 65/00 (2013.01); C08G 65/22 (2013.01); C08G 65/2612 (2013.01)
USPC ........... 528/393; 568/583; 568/606; 568/607; 568/700; 568/704

(58) Field of Classification Search
CPC ........ C08G 65/00; C08G 65/08; C08G 65/22; C08G 65/26; C08G 65/2609; C08G 65/2612; C08G 65/2633; C08G 65/2648
USPC ........... 528/393; 568/583, 606, 607, 700, 704
See application file for complete search history.

(56) References Cited

U.S. PATENT DOCUMENTS

| 7,060,776 B2 * | 6/2006 | Algotsson et al. ......... 526/307.3 |
| 2003/0120022 A1 | 6/2003 | Sunder et al. |
| 2005/0085613 A1 | 4/2005 | Adkins et al. |

FOREIGN PATENT DOCUMENTS

| CA | 2355727 A1 | 6/2000 |
| EP | 1785410 A1 | 5/2007 |
| JP | 09-188755 A | 7/1997 |
| JP | 09-235246 A | 9/1997 |
| JP | 2007509207 A | 4/2007 |
| JP | 2007-154075 A | 6/2007 |
| WO | WO-0037532 A2 | 6/2000 |
| WO | WO 2006/075954 A1 * | 7/2006 |

OTHER PUBLICATIONS

Melhem et al. (Process Safety Progress, vol. 20, No. 4, Published Dec. 2001, pp. 231-246).*
"International Application No. PCT/EP2010/003387, International Preliminary Report on Patentability mailed Jan. 19, 2012", 6 pgs.
"International Application No. PCT/EP2010/003387, International Search Report mailed Jul. 29, 2010", (w/ English Translation), (Jul. 29, 2010), 7 pgs.
Dworak, A., "Poly(α-τ-butoxy-ω-styrylo-glycidol): a new reactive surfactant", *Polymer Bulletin*, 40, (1998), 461-468.
Hoskyns, W. F., "Polyglycidol adducts of hydroxyl group containing addition polymerizabie monomers", (No. 17437), *Research Disclosure*, 174(37), (Oct. 1978), 32-33.

* cited by examiner

*Primary Examiner* — Richard Schnizer
*Assistant Examiner* — Alma Pipic
(74) *Attorney, Agent, or Firm* — Schwegman Lundberg & Woessner, P.A.

(57) ABSTRACT

Process for preparing a macromonomer, in which a starting compound $H_2C=CR^1-C_6H_{4-s}(R^4)_s-R^3-OH$ or $H_2C=CR^2-CO-NH-R^3-OH$, where $R^1$ and $R^2$ are each H or a linear or branched alkyl radical having from 1 to 4 carbon atoms, $R^3$ is a linear or branched alkylene, aralkylene radical which has from 1 to 20 carbon atoms and can contain one or more hydroxy groups and the radicals $R^4$ are each, independently of one another, a linear or branched alkyl, aralkyl, alkoxy or aralkoxy radical having from 1 to 20 carbon atoms and s=0-4, is, after partial deprotonation, reacted with at least one hydroxy-functional oxirane compound in the presence of an inhibitor of free-radical polymerization with opening of the oxirane ring, where the molar ratio of the molar amounts used $n_{(starting\ compound)}:n_{(oxirane\ compound)}$ is in the range from 1:100 to 1:1.
Macromonomers which can be obtained by the process, polymers which can be obtained therefrom and their use as additives in coating compositions, plastics and cosmetics.

5 Claims, No Drawings

TERMINAL UNSATURATED, GLYCIDOL-BASED MACROMONOMERS, POLYMERS OBTAINABLE THEREFROM, PREPARATION AND USE

PRIORITY CLAIM TO RELATED APPLICATIONS

This application is a national stage application under 35 U.S.C. §371 of PCT/EP2010/003387, filed Jun. 4, 2010, and published as WO 2010/145761 A1 on Dec. 23, 2010, which claims priority to European Application No. 09008128.2, filed Jun. 19, 2009, which applications and publication are incorporated herein by reference and made a part hereof in their entirety, and the benefit of priority of each of which is claimed herein.

The invention relates to terminally unsaturated, glycidol-based macromonomers, a process for preparing them, polymers which can be obtained therefrom and also the use of the polymers as additives in coating compositions, plastics and cosmetics.

PRIOR ART

Macromonomers are oligomers or polymers having at least one functional end group via which polymerization reactions can occur. Macromonomers are thus macromolecular monomers which can be reacted to form homopolymers or copolymers having defined structures. For example, macromonomers having an ethylenically unsaturated end group can be converted by free-radical polymerization into graft copolymers or comb polymers having a defined length of the side chains.

Dworak et al. (Polymer Bulletin 40, 461-468 (1998)) describe the preparation of linear, glycidol-based macromonomers having a terminal styrene group. The terminal styrene group is introduced via a termination reaction. A disadvantage here is the need to use an excess of terminating reagent (p-chloromethylstyrene) in order to be able to achieve complete functionalization of the intermediates. If only equimolar amounts of terminating reagent are used, functionalization is not quantitative. Owing to the necessity of using an excess of terminating reagent and secondary reactions which proceed, the end product has to be purified.

JP 09-188755 A describes the preparation of linear polyglycerol monoalkyl ethers having primary hydroxyl groups by reaction of a glycidyl ester with an aliphatic alcohol and subsequent hydrolysis of the resulting adduct. The linear polyglycerol monoalkyl ethers have no terminal unsaturated group.

JP 09-235246 A describes the preparation of a polyglycerol by means of addition polymerization of a particular glycidol derivative having protective groups and an organic alcohol. The protective group is subsequently removed.

EP 1-85 410 A1 describes the preparation of polyglycerol monoethers of various alcohols by anionic ring-opening polymerization of glycidol. The process is said to give polyglycerol monoethers which are said to be suitable for use in foodstuffs or cosmetics.

US 2003/0120022 A1 describes the preparation of highly branched polyols by anionic ring-opening polymerization of glycidol in the presence of a starter molecule having an active hydrogen atom. The starter molecule can contain allyl groups or 10-undecenyl groups.

JP 2007-154075 A describes the preparation of an emulsifier for emulsion polymerization. To synthesize the emulsifier, the oxirane ring of a glycidyl (meth)acrylate is firstly opened by means of an alcohol. The resulting secondary hydroxyl group of the adduct is subsequently utilized for the polymerization of glycidol. The resulting emulsifiers have a (meth)acrylate-based head group and a polyglycidol radical which are necessarily joined via a branched, substituted alkyl ether group.

W. F. Hoskyns (Research Disclosure 174, 32-33 (1978)) describes polymer adducts of glycidol and various hydroxy-functional unsaturated compounds. As hydroxy-functional unsaturated compounds, preference is given to using (meth)acrylic esters, for example 2-hydroxyethyl methacrylate. To prepare the polymer adducts, glycidol is placed in a reaction vessel and admixed at a temperature of 150° C. with a mixture of catalyst (e.g. potassium hydroxide), inhibitor of the free-radical polymerization and 2-hydroxyethyl methacrylate. Undesirable secondary reactions such as the formation of homopolyglycidols by autopolymerization of glycidol and undesirable secondary reactions on the oxygen of the ester group ("back-biting", transesterification) are promoted by the use of esters as unsaturated compounds, the high reaction temperature and the reaction sequence described.

OBJECT

It was an object of the present invention to provide glycidol-based macromonomers which have at least one free-radically polymerizable head group per molecule, have a very low level of by-products and from which novel homopolymers and/or copolymers which can be used as additives in coating compositions, plastics and/or cosmetics can be obtained by free-radical homopolymerization or copolymerization, if appropriate with further comonomers, and a process for preparing them. The preparative process should give these glycidol-based macromonomers with a very uniform, well-defined structure. The proportion of secondary reactions and by-products should be very low. In particular, virtually no "back-biting" should occur.

It was a further object of the present invention to provide novel homopolymers and/or copolymers which can be obtained from glycidol-based macromonomers and, if appropriate, further comonomers and are suitable for use as additives in coating compositions, plastics and cosmetics, and a process for preparing them.

The properties of the coating compositions or coatings, plastics and/or cosmetics should be able to be altered in a targeted manner by use of the homopolymers and/or copolymers as additives.

For example, it should be possible to obtain additives which are suitable as levelling agents and can, for example, improve the levelling, the gloss and/or the opalescence of the coating compositions or coatings or plastics.

For example, it should be possible to obtain additives which give the coating compositions or coatings and/or the plastics a non-stick surface so that, for example, dirt-, water- and/or oil-repellent surfaces can be achieved.

For example, it should be possible to obtain additives which are suitable as wetting agents and dispersants and can, for example, lower the viscosity of pigmented and/or filler-containing coating compositions and/or stabilize the dispersion of pigments and/or fillers in coating compositions, plastics or cosmetics.

For example, it should be possible to obtain additives which give the coating compositions or coatings and/or plastics improved wettability, so that, for example, more readily printable surfaces are achieved and/or the adhesion of coatings is improved. Many coatings, polymeric moulding compositions and thermoplastics have a nonpolar surface having a low surface energy. The wetting (overcoatability) of such surfaces by, for example, aqueous coating compositions, printing inks, aqueous polymer dispersions, adhesives or bonding agents is therefore a challenge. To improve the wettability of such substrate surfaces by polar (e.g. aqueous) coating compositions, the surface energy of the substrate has to be increased by use of additives, so that the substrate surfaces are made more polar. For this reason, there is a need to develop appropriate additives for improving the wettability and thus, for example, the printability or coatability of various coatings, polymeric moulding compositions and thermoplastics.

Furthermore, the additives added to produce these improved properties should have very little adverse effect on the other properties of the coating compositions or coatings, plastics or cosmetics. The additives added should also display their effect in relatively small amounts. The coatings and plastics (polymeric moulding compositions and thermoplastics) should virtually retain their improved surface properties over a long period of a number of years, even when exposed to exterior weathering. This should also include the permanence of the effects, for example the non-stick and/or dirt-repellent effect, over a number of cleaning cycles.

Furthermore, coating compositions or coatings and plastics (i.e. polymeric moulding compositions and thermoplastics) and cosmetics which have such improved properties should be provided.

ACHIEVEMENT OF THE OBJECT

The objects are surprisingly achieved by the subject matter of the independent claims. Particular embodiments of the invention are described in the dependent claims.

The invention firstly provides a process for preparing a macromonomer, wherein (A) a starting compound U—OH, where
U—O—=an ethylenically unsaturated head group selected from the group consisting of
a) radicals of the general formula (I)

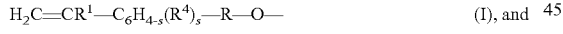

b) radicals of the general formula (II)

where $R^1$ and $R^2$ are each H or a linear or branched alkyl radical having from 1 to 4 carbon atoms,
$R^3$ is a linear or branched alkylene, aralkylene radical which has from 1 to 20 carbon atoms and can contain one or more hydroxy groups
and the radicals $R^4$ are each, independently of one another, a linear or branched alkyl, aralkyl, alkoxy or aralkoxy radical having from 1 to 20 carbon atoms and s is 0-4,
is partially deprotonated by addition of an alkali metal hydroxide or an alkoxide with formation of water or alcohol so as to form a mixture of protonated (U—OH) and deprotonated (U—O$^{(-)}$) molecules of the starting compound, (B) the water formed or the alcohol formed is then substantially removed from the reaction mixture and (C) the mixture of protonated (U—OH) and deprotonated (U—O$^{(-)}$) molecules of the starting compound is subsequently reacted with at least one oxirane compound of the formula (III)

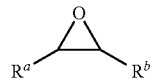

where $R^a$ is hydrogen, methyl, ethyl, n-propyl, isopropyl, n-butyl, isobutyl, sec-butyl or tert-butyl and $R^b$ is a linear or branched alkyl radical having from 1 to 6 carbon atoms and at least one hydroxy group which car optionally be etherified with a protective group, and, if appropriate, at least one alkylene oxide in the presence of an inhibitor of the free-radical polymerization with opening of the oxirane ring, where the molar ratio of the amounts used $n_{(starting\ compound)}$:$n_{(oxirane\ compound)}$ is in the range from 1:1000 to 1:1.

The invention further provides a macromonomer which can be obtained by the above-described process.

The invention further provides a polymer which can be obtained by free-radical polymerization of one or more of the above-described macromonomers and, if appropriate, one or more further, free-radically polymerizable comonomers.

The invention further provides a process for preparing the above-described polymer, wherein at least one above-described macromonomer and if appropriate one or more further, free-radically polymerizable comonomers are free-radically polymerized.

The invention further provides for the use of the above-described polymer as additive in coating compositions, plastics or cosmetics.

The invention further provides coating compositions, plastics and cosmetics containing at least one above-described polymer.

DETAILED DESCRIPTION OF THE INVENTION

Macromonomers and their Preparation

Starting Compound U—OH
The starting compound U—OH has an ethylenically unsaturated head group U—O— selected from the group consisting of
a) radicals of the general formula (I)

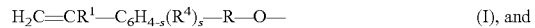

b) radicals of the general formula (II)

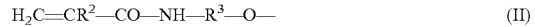

where $R^1$ and $R^2$ are each H or a linear or branched alkyl radical having from 1 to 4 carbon atoms,
preferably H or CH$_3$, and
$R^3$ is a linear or branched alkylene, aralkylene radical which has from 1 to 20 carbon atoms and can contain one or more hydroxy groups
and the radicals $R^4$ are each, independently of one another, a linear or branched alkyl, aralkyl, alkoxy or aralkoxy radical having from 1 to 20 carbon atoms and s is 0-4.

In the radicals of the general formula (I), the substituents (H$_2$C=CR$^1$—) and (—R$^3$—O—) on the phenyl ring (—C$_6$H$_{4-s}$(R$^4$)$_s$—) can be in the ortho, meta or para position relative to one another. In addition, the phenyl ring (—C$_6$H$_{4-s}$(R$^4$)$_s$—) bears either no (s=0) or from 1 to 4 (s=1-4) further substituents R$^4$.

Suitable starting compounds U—OH are thus
a) substituted or unsubstituted α-vinylphenylalkyl-ω-hydroxy compounds of the formula H$_2$C=CR$^1$—C$_6$H$_{4-s}$(R$^4$)$_s$—R$^3$—OH, for example vinylbenzyl alcohol (H$_2$C=CH—C$_6$H$_4$—CH$_2$—OH) or b) substituted or unsubstituted N-(hydroxyalkyl)acrylamides of the formula $H_2C=CR^2-CO-NH-R^3-OH$, for example N-(2-hydroxypropyl)methacrylamide ($H_2C=C(CH)-CO-NH-CH_2-CH(CH_3)-OH$), N-[1-(hydroxymethyl)propyl]methacrylamide ($H_2C=C(CH_3)-CO-NH-CH(CH-CH_3)-CH_2-OH$) or N-(2,3-dihydroxypropyl)methacrylamide ($H_2C=C(CH_3)-CO-NH-CH_2-CH(OH)-CH_2-OH$)

The substituents $R^1$, $R^2$, $R^3$ and $R^4$ are as defined above.

The ethylenically unsaturated head group U—O— is preferably a radical of the general formula (II)

$$H_2C=CR^2-CO-NH-R^3-O- \qquad (II)$$

where $R^2$=H or $CH_3$ and
$R^3$=ethyl or propyl.

In this case, the starting compound U—OH is a compound selected from the group consisting of hydroxyethyl(meth)acrylamide and hydroxypropyl(meth)acrylamide. The notation "(meth)acryl" encompasses both "acryl" and "methacryl".

The ethylenically unsaturated head group is particularly preferably a radical of the general formula (II)

$$H_2C=CR^2-CO-NH-R^3-O- \qquad (II)$$

where $R^2=CH_3$ and
$R^3$=ethyl.

In this case, the starting compound U—OH is the compound N-(2-hydroxyethyl)methacrylamide.

It is important for the purposes of the invention that the starting compound U—OH contains no further readily hydrolysable groups in addition to the hydroxyl group —OH, in particular no ester oxygen. This has the advantage that undesirable secondary reactions ("back-biting") which can otherwise occur on these groups during the anionic ring-opening polymerization can be very largely avoided. In particular, it is important that the starting compound U—OH is not a (meth)acrylic ester such as N-(2-hydroxyethyl)methacrylate (HEMA). This avoids "back-biting", i.e. undesirable reactions on the ester oxygen (in addition to the desired polymerization reaction on the hydroxyl group), which can lead to sparingly soluble, unusable by-products (e.g. homopolyglycidol and products containing more than one ethylenically unsaturated group).

The presence of such by-products is also, in particular, undesirable because they can lead to the following problems in a subsequent copolymerization of the macromonomers obtained: any homopolyglycidol present is also reacted in the copolymerization, resulting in homopolyglycidol-containing copolymerization products which as additives have undesirable properties such as incompatibilities and can lead to surface defects. On the other hand, any by-products containing more than one unsaturated group which may be present can lead to undesirable crosslinking of the copolymers.

Hydroxy-Functional Oxirane Compound

The oxirane compound corresponds to the formula (III)

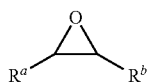
(III)

where $R^a$ is hydrogen, methyl, ethyl, n-propyl, isopropyl, n-butyl, isobutyl, sec-butyl or tert-butyl and $R^b$ is a linear or branched alkyl radical having from 1 to 6 carbon atoms and at least one hydroxy group which can optionally be etherified with a protective group.

$R^a$ is preferably hydrogen.

The alkyl radical $R^b$ preferably has precisely one hydroxy group. The alkyl radical $R^b$ preferably has a terminal hydroxy group. The alkyl radical $R^b$ particularly preferably has precisely one terminal hydroxy group.

The alkyl radical $R^b$ can be linear or branched. $R^b$ is preferably an alkyl radical having from 1 to 3 carbon atoms, preferably one or two carbon atoms.

The alkyl radical $R^b$ is very particularly preferably hydroxymethyl.

For example, glycidol (1,2-epoxy-3-hydroxypropane) can be used as oxirane compound.

The hydroxy group (s) of the alkyl radical $R^b$ can be present in free form or can be etherified with a protective group.

If macromonomers having a branched oxirane-based radical are to be obtained, at least one oxirane compound having at least one free hydroxy group is used. The opening of the oxirane ring in the presence of a basic catalyst firstly forms a secondary hydroxy group whose proton is exchanged rapidly with that of the free hydroxy group of the oxirane compound. The rapid proton exchange, which also encompasses the further hydroxy groups of the molecule formed, ensures that all hydroxy groups are active in the polymerization reaction and are available as chain extension points, so that branched products are obtained. When the proportion of oxirane compounds having free hydroxy groups, based on all oxirane compounds used, is relatively high, relatively highly branched products are generally obtained.

On the other hand, if macromonomers having a linear oxirane-based radical are to be obtained, the hydroxy groups of the oxirane compounds are firstly provided with a suitable protective group before the anionic ring-opening polymerization. Suitable protective groups are those which are stable under the basic conditions of the anionic ring-opening polymerization and can easily be removed again, for example by hydrolysis, after the polymerization is complete so as to give the original hydroxyl groups again. Examples of preferred protective groups are acetal groups such as ethoxyethyl groups, O-tert-butyl groups and O-benzyl groups. Acetal groups are particularly preferred because they can easily be removed using Brönsted acids (e.g. HCl) or Lewis acids (e.g. $AlCl_3$). For example, glycidol (2,3-epoxy-1-propanol) can firstly be reacted with ethyl vinyl ether to form ethoxyethy glycidyl ether (EEGE) [Fitton A, Hill J, Jane D, Millar R. Synthesis 1987, 1140]. As a result of the presence of a protective group on the hydroxy group of the alkyl radical $R^b$ of the oxirane compound, only one active hydroxyl group is available as chain extension point in the growing polymer chain at all times during the anionic ring-opening polymerization, so that linear products are obtained. After the polymerization is complete, the protective groups can be removed in a subsequent reaction step so as to give the original hydroxyl groups of the oxirane monomers again.

Alkylene Oxides

The anionic ring-opening polymerization of the oxirane compounds of the formula (III) can be carried out in the presence of one or more alkylene oxides.

For the purposes of the present invention, alkylene oxides are the alkylene oxides of the formula (IV) and the formula (V) (glycidyl ethers)

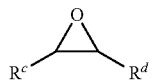
(IV)

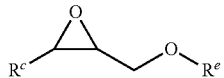

(V)

Here, the radicals $R^c$, $R^d$ and $R^e$ are selected independently from the group consisting of linear and branched alkyl, aryl and aralkyl radicals having 1-20 carbon atoms. In addition, $R^c$ and $R^d$ can also be hydrogen.

Examples of suitable alkylene oxides of the formula (IV) are ethylene oxide, propylene oxide, butylene oxide, pentylene oxide (1,2-epoxypentane) and hexylene oxide (1,2-epoxyhexane) and also styrene oxide. Examples of suitable glycidyl ethers of the formula (V) are methyl glycidyl ether, ethyl glycidyl ether, propyl glycidyl ether, n-butyl glycidyl ether, 2-ethylhexyl glycidyl ether, lauryl glycidyl ether, stearyl glycidyl ether and phenyl glycidyl ether. Preference is given to ethylene oxide and/or propylene oxide. In contrast to the abovementioned oxirane compounds of the formula (III), the alkylene oxides of the formulae (IV) and (V) do not have a hydroxy group. The synthesis of the macromonomers can be carried out under superatmospheric pressure when this is necessary, e.g. when using gaseous alkylene oxides such as ethylene oxide.

In a preferred embodiment of the invention, no alkylene oxide is used. However, the use of one or more alkylene oxides can influence subsequent properties such as foam formation, viscosity and crystallinity. If at least one alkylene oxide is used, the molar ratio of the amounts used, $[n_{(oxirane\ compound)}+n_{(alkene\ oxide)}]:n_{(starting\ compound)}$, is in the range from 100:1 to 2:1, more preferably from 50:1 to 3:1 and particularly preferably from 20:1 to 3:1.

The oxirane compounds of the formulae (III), (IV) and (V) can be polymerized randomly, blockwise or with a gradient.

Preparation of the Macromonomers by Anionic Polymerization

The macromonomers can be prepared by partially deprotonating (A) a starting compound U—OH, where U—O— is an ethylenically unsaturated head group selected from the group consisting of a) radicals of the general formula (I)

$$H_2C=CR^1-C_6H_{4-s}(R^4)_s-R-O-$$  (I), and b) radicals of the general formula (II)

$$H_2C=CR^2-CO-NH-R^3-O-$$  (II)

where $R^1$ and $R^2$ are each H or a linear or branched alkyl radical having from 1 to 4 carbon atoms, $R^3$ is a linear or branched alkylene, aralkylene radical which has from 1 to 20 carbon atoms and can contain one or more hydroxy groups and the radicals $R^4$ are each, independently of one another, a linear or branched alkyl, aralkyl, alkoxy or aralkoxy radical having from 1 to 20 carbon atoms and s is 0-4, by addition of an alkali metal hydroxide or an alkoxide with formation of water or alcohol so as to form a mixture of protonated (U—OH) and deprotonated (U—O$^{(-)}$) molecules of the starting compound, then (B) substantially removing the water formed or the alcohol formed from the reaction mixture and subsequently (C) reacting the mixture of protonated (U—OH) and deprotonated (U—O$^{(-)}$) molecules of the starting compound with at least one oxirane compound of the formula (III)

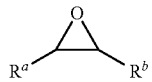

(III)

where $R^a$ is hydrogen, methyl, ethyl, n-propyl, isopropyl, n-butyl, isobutyl, sec-butyl or tert-butyl and $R^b$ is a linear or branched alkyl radical which has from 1 to 6 carbon atoms and at least one hydroxy group which may optionally be etherified with a protective group, and if appropriate at least one alkylene oxide, in the presence of an inhibitor of the free-radical polymerization with opening of the oxirane ring, where the molar ratio of the amounts used $n_{(starting\ compound)}:n_{(oxirane\ compound)}$ is in the range from 1:100 to 1:1.

As alkali metal hydroxide or alkoxide, it is possible to use basic compounds which can effect partial or complete deprotonation of the —OH group of the starting compound. Examples of suitable compounds are alkali metal hydroxides, e.g. potassium hydroxide, or alkali metal alkoxides such as potassium alkanolates, for example potassium tert-butoxide. The compound(s) is/are firstly added to the starting compound and the water formed by the partial or complete deprotonation of the OH group of the starting compound or the alcohol formed is substantially removed from the reaction mixture by distillation. Preference is given to 0.1-80%, particularly preferably 2-20%, of the OH groups of the starting compound being deprotonated by addition of the alkali metal hydroxide or alkoxide, so that a mixture of 0.1-80% of deprotonated (U—O$^{(-)}$) and 20-99.9% of protonated (U—OH) molecules of the starting compound, particularly preferably a mixture of 2-20% of deprotonated (U—O$^{(-)}$) and 20-99.9% of protonated (U—OH) molecules of the starting compound, is present. For the purposes of the present invention, "substantially removed" means that the major part of the water or alcohol formed is removed, so that at most small residual amounts of water or alcohol remain in the reaction mixture, namely less than 0.1% by weight based on the reaction mixture.

To avoid premature polymerization of the free-radically polymerizable head group U of the starting compound, the anionic ring-opening polymerization is carried out in the presence of at least one inhibitor of the free-radical polymerization. The inhibitors of the free-radical polymerization can scavenge free radicals which could possibly be formed during the anionic polymerization, so that the stability of the free-radically polymerizable, ethylenically unsaturated head group U in the starting compound and also in the macromonomers obtained is ensured during the reaction and during later storage. Suitable inhibitors of the free-radical polymerization are, for example, hydroquinone or hydroquinone monomethyl ether.

For example, a process for preparing the macromonomers can be carried out as follows. The reaction is carried out under inert gas, for example under a stream of nitrogen or a stream of argon. A starting compound U—OH is partially deprotonated by means of a suitable base (e.g. alkali metal hydroxide or alkali metal alkoxide). For example, from 0.1 to 80% of the OH groups of the starting compound are deprotonated, preferably 2-20%. The water formed or the alcohol formed is removed by distillation. A mixture of, for example, 0.1-80% of deprotonated (U—O$^{(-)}$) and 20-99.9% of protonated (U—OH) molecules of the starting compound, preferably a mixture of 2-20% of deprotonated (U—O$^{(-)}$) and 20-99.9% of protonated (U—OH) molecules of the starting compound, is obtained. This is heated to from 40° C. to 120° C., preferably from 50° C. to 100° C., particularly preferably to from 60° C. to 90° C., before the oxirane compounds, if appropriate provided with protective groups, and if appropriate alkylene oxide comonomers are added at this temperature. A slow addition of the oxirane compound (s) is preferred since better defined structures are obtained in the case of a slow addition. The anionic ring-opening polymerization is controlled by the rapid exchange of protons between the hydroxy groups and gives well-defined products having a narrow molecular weight distribution.

If the polymerization is carried out in the presence of one or more alkylene oxides (e.g. ethylene oxide, propylene oxide, butylene oxide), it can be carried out by known methods. Descriptions of suitable reaction conditions for customary processes known to those skilled in the art and suitable apparatuses for syntheses under superatmospheric pressure may be found, for example, in Nikolaus Schönfeldt, "Grenzflächenaktive Äthylenoxid-Addukte", Wissenschaftliche Verlagsgesellschaft mbH, Stuttgart (1984) and in the references cited therein.

After the reaction is complete, the product can be neutralized by addition of acid or by treatment with an acidic ion-exchange resin and the neutralization products can be removed. If oxirane compounds having protective groups were used, these can be removed simultaneously or subsequently, for example by acid hydrolysis. If, for example, acetal protective groups are present, these can easily be removed from the product by hydrolysis by acidifying the reaction medium by addition of an excess of acid or by treatment with an acidic ion-exchange resin and the end product can at the same time be neutralized by the excess of acid or be bound by the acidic ion-exchange resin.

The anionic ring-opening polymerization can be carried out in the presence of one or more suitable solvents. Suitable solvents are those which do not interfere in the anionic ring-opening polymerization, i.e., for example, have no labile groups or cyclic groups which could be opened during the polymerization and, for example, do not contain any groups which could react under the basic reaction conditions with the hydroxyl groups of the oxirane compound (s), the starting compound or the macromonomer formed or in another way. Suitable solvents are, for example, corresponding aliphatic, cycloaliphatic and aromatic solvents and also blocked polyalkylene oxides and mixtures thereof. Suitable solvents are in particular, for example, toluene, xylene, glyme (1,2-dimethoxyethane), diglyme ((2-methoxyethyl)ether), butyldiglyme (diethylene glycol dibutyl ether) and polyglymes such as polyethylene glycol dimethyl ether having a molecular weight above 200 g/mol.

The hydroxyl groups of the macromonomer obtained can be present in free form, i.e. unprotected, be entirely or partly provided with protective groups and/or be functionalized. In this way, the properties of the macromonomers and/or the polymers obtainable therefrom can be influenced, for example the compatibility with coating systems or various plastics or cosmetic formulations. It is possible to influence, for example, possible foam formation, the adsorption on surfaces and the orientation of the product at interfaces.

The hydroxyl groups of the macromonomer obtained can, for example, be modified by means of lactones such as epsilon-caprolactone or delta-valerolactone with opening of the lactone ring and, if appropriate, with polymerization of the lactone.

Further side chains can be obtained, for example, by reaction of the hydroxyl groups with isocyanates to form urethane groups. Thus, for example, polyalkylene oxide side chains, e.g. polyethylene (EO), polypropylene (PO) and/or mixed EO/PO chains (having a random, blockwise or gradated distribution of the EO/PO monomers), can be grafted on by reaction of the hydroxyl groups with monoadducts of polyalkylene oxides and TDI (tolylene diisocyanate).

Further methods of modifying the hydroxyl groups of the macromonomers are, for example, reaction with epoxides, the Williamson ether synthesis, methylation by means of diazomethane, acetylation by means of acetic anhydride or reaction with cyclic acid anhydrides and also carboxymethylation. In principle, any modification which does not have an adverse effect on the subsequent free-radical polymerization or the ethylenically unsaturated head group U is suitable.

Polymers, their Preparation and Use

The polymers can be obtained by free-radical polymerization of one or more of the above-described macromonomers and if appropriate one or more further, free-radically polymerizable comonomers.

To prepare the polymers, one or more different above-described macromonomers can be free-radically homo-polymerized or copolymerized. Among the macromonomers, those macromonomers which are obtained according to the above-described preferred embodiments are preferably used for preparing the polymers.

The polymers can be homopolymers or copolymers. The polymers are preferably copolymers.

Comonomers

In addition to the above-described macromonomers or macromonomers, one or more comonomers which are different therefrom and are free-radically polymerizable can be used for the free-radical polymerization. Preference is given to using at least one such comonomer. For the purposes of the present invention, free-radically polymerizable comonomers are compounds which bear at least one free-radically polymerizable group. Free-radically polymerizable groups are functional groups which can be polymerized by a free radical mechanism under conditions customary for this purpose, for example ethylenically unsaturated group. This ethylenically unsaturated group is preferably selected from the group consisting of substituted or unsubstituted acrylic, methacrylic, acrylamido, methacrylamido, acrylamidoalkyl, methacrylamidoalkyl, styryl, alpha-methylstyryl, allyl, vinylbenzyl, vinyl ether, vinyl ester and vinyl ketone groups, especially when the macromonomers used bear acrylic, methacrylic or styrene groups as head groups U.

Examples of suitable comonomers are alkyl acrylates and alkyl methacrylates of straight-chain, branched or cycloaliphatic alcohols having from 1 to 24 carbon atoms, aralkyl acrylates and aralkyl methacrylates of aralkyl alcohols having from 8 to 18 carbon atoms, hydroxyalkyl (meth) acrylates of straight-chain, branched or cycloaliphatic diols having from 2 to 36 carbon atoms, alkyl(meth)acrylamides of straight-chain, branched or cycloaliphatic amines having from 1 to 22 carbon atoms, aminoalkyl (meth)acrylates of straight-chain, branched or cycloaliphatic amino alcohols having from 2 to 8 carbon atoms, alkoxylated (meth)acrylates (e.g, for example, polyethylene glycol (meth)acrylates, polypropylene glycol (meth)acrylates, polyethylene glycol-polypropylene glycol (meth)acrylates, polyester-modified (meth)acrylates (e.g., for example, caprolactone-modified (meth)acrylates which can be obtained, for example, from Daicel, Japan), (meth)acrylonitriles, vinyl alkanoates, alkenes and arylalkenes having from 2 to 30 carbon atoms, styrenes and substituted styrenes, alpha-methylstyrenes and substituted alpha-methylstyrenes, alkyl vinyl ethers, perfluoroalkyl (meth)acrylates and corresponding partially fluorinated (meth)acrylates, perfluoroalkyl block polyether (meth) acrylates, perfluoroalkylethylthiocarbonylaminoethyl (meth) acrylates, perfluoroolefins, (meth)acryloxyalkylsiloxanes, (meth)acryloxyalkylpolysiloxanes, (meth)acryloxypolyetheralkylpolysiloxanes, n-vinylcarbazoles, fluorinated and fluorine-free alkyl esters of maleic acid, of fumaric acid, of itaconic acid and of mesaconic acid (methylfumaric acid), (meth)acrylamide, (meth)acrylamides, methacrylic acid, acrylic acid, hydroxy-functional alkyl (meth)acrylamides, hydroxy-functional alkyl vinyl ethers, sodium vinylsulphonate, sodium styrene-sulphonate, 2-acrylamido-2-methylpropane sulphonic acid, N-vinylpyrrole, N-vinyl-2-pyrrolidone, 2-vinyl-oxazolidine, 2-vinylpyridine, 4-vinylpyridine, 1-[2-(methacryloxy)ethyl]-2-imidazolidinone, aminoalkyl (meth)acrylates, for example N,N-dimethylaminoethyl (meth)acrylate and N,N-dimethylaminopropyl (meth)acrylate, N-alkyl- and N,N-dialkyl-substituted acrylamides having straight-chain, branched or cycloaliphatic alkyl groups having from 1 to 22 carbon atoms, for example N-(t-butyl) acrylamide and N,N-dimethylacrylamide; ionic monomers, allyl alcohol, alkoxylated allyl alcohol derivatives (for example ethoxylated allyl alcohol, propoxylated a alcohol and mixed-alkoxylated allyl alcohol containing proportions of ethylene oxide and propylene oxide) and also polyester-modified (for example by means of caprolactone) derivatives based on allyl alcohol.

Preference is given to using comonomers such as polydimethylsiloxane mono(meth)acrylates, for example linear (meth)acryloxyalkylpolydimethylsiloxanes (e.g. α-butyldimethylsiloxy-ω-(3-methacryloxypropyl)polydimethylsiloxane or α-butyldimethylsiloxy-ω-(3-acryloxy-2-hydroxypropoxypropyl)polydimethylsiloxane), branched (meth)acryloxyalkyl polydimethylsiloxanes (e.g. methacryl oxypropyl-terminated, branched polydimethylsiloxanes such as (methacryloxypropyl)methylsiloxane-polydimethylsiloxane copolymers or methacryloxypropyl-polydimethylsiloxanes having a T-shaped structure), (meth)acrylpolyetherakylpolydimethylsiloxanes (e.g. α-butyldimethylsiloxy-ω-(3-methacryloxy(polyethylene oxide) propyl) polydimethylsiloxane) or polydimethylsiloxanemonoalkenes, particularly preferably polydimethylsiloxane mono(meth)acrylates. This gives copolymers which, as additives, can be used to good effect for reducing the surface tension in coating compositions and plastics or for obtaining scratch-resistant surfaces with a long-lasting antifingerprint effect and dirt-repellent properties.

Preference is given to using fluorinated comonomers. This gives copolymers which, as additives, can be used particularly well as levelling agents, for reducing the surface tension in coating compositions and plastics or for obtaining dirt-repellent surfaces.

Preference is given to using esters of (meth)acrylic acid with alkanols, for example with C1-C4-monohydroxyalkanes, as comonomers. This gives copolymers which as additives can be used very particularly well for improving the levelling, the gloss and/or the opalescence of the coating compositions or coatings or plastics. It is possible to use, for example, n-butyl acrylate, i-butyl acrylate, t-butyl acrylate, methyl acrylate, ethyl acrylate, propy acrylate, hexyl acrylate, 2-ethylhexyl acrylate, cyclohexyl acrylate, lauryl acrylate, tetradecyl acrylate, isobornyl acrylate, n-butyl methacrylate, i-butyl methacrylate, t-butyl methacrylate, methyl methacrylate, ethyl methacrylate, propy methacrylate, hexyl methacrylate, 2-ethylhexyl methacrylate, cyclohexyl methacrylate, lauryl methacrylate, etradecyl methacrylate and/or isobornyl methacrylate. Further preferred monomers are hydroxyethyl acrylate, hydroxybutyl acrylate, hydroxyethyl methacrylate, hydroxybutyl methacrylate, 2-methoxyethyl acrylate, 2-methoxyethyl methacrylate, styrene, ethyl vinyl ether, butyl vinyl ether, hydroxybutyl vinyl ether, methacrylic acid and acrylic acid.

For the preparation of wetting agents and dispersants, bonding agents and emulsifiers, the following comonomers are preferred: maleic anhydride, polyethylene glycol monomethacrylate, polypropylene glycol monomethacrylate, N,N'-dimethylaminoethyl methacrylate, N,N'-dimethylaminoethyl acrylate, 2-vinylpyridine, 4-vinylpyridine, vinylimidazole.

The use of mixtures of the abovementioned preferred comonomers and mixtures of these comonomers with other comonomers is also preferred.

The notation (meth)acrylate encompasses both acrylates and methacrylates.

Ionic groups can be introduced as corresponding ionic, ethylenically unsaturated monomer into the polymer or be subsequently produced by polymer-analogous reactions, for example salt formation or quaternization of tertiary amino compounds.

Thus, it is possible, for example, to react acid functions in the polymer, for example carboxylic acids and phosphoric esters, with bases. It is also possible, starting out from acid anhydrides such as maleic anhydride, firstly to generate the carboxylic acid function by hydrolysis with water or formation of a monoester or partial ester with monohydric alcohols or polyethers and subsequently react this with bases.

Oxirane structures in the polymer can be reacted with nucleophiles such as o-phosphoric acid and subsequent salt formation by means of bases to produce ionic groups.

Hydroxy functions in the polymer can be reacted with polyphosphoric acid to form phosphoric esters and subsequent salt formation by means of bases to produce ionic groups.

Suitable bases are, for example, for example, amines such as dimethylaminoethanol, diethanolamine, triethanolamine, 2-(dimethylamino)propan-1-ol, triethylamine, butylamine and dibutylamine, hydroxides, oxides, carbonates and hydrogencarbonates of metals of the 1st to 3rd main groups of the Periodic Table of the Elements, for example sodium hydroxide, potassium hydroxide, aluminium hydroxide and sodium hydrogen-carbonate.

As described in U.S. Pat. No. 6,111,054, it is also possible to carry out the conversion of amines bound to the polymer into salts by means of carboxylic acids or phosphoric acids and esters thereof.

Furthermore, amines can be converted into quaternary ammonium salts in alkylation reactions with alkyl halides, for example benzyl chloride, or with a combination of oxirane with carboxylic acid.

Tertiary amines can be converted by means of oxygen, peroxo compounds such as percarboxylic acids and hydrogen peroxide into amine oxides which can additionally be converted into salts by means of acids such as hydrochloric acid.

Examples of ionic, ethylenically unsaturated monomers can be taken from the following list, with the notation (meth)acrylate including both acrylates and methacrylates: salts of acrylic acid, methacrylic acid or maleic acid; quaternary aminoalkyl (meth)acrylates such as 2-trimethylammonioethyl methacrylate chloride and 2-benzyldimethylammonioethyl (meth)acrylate chloride; salts of monomers containing phosphoric acid, for example sodium tripropylene glycol methacrylate phosphate.

Self-crosslinking polymers can be prepared in a controlled manner by, or example, the use of epoxy-functional comonomers, e.g. glycidyl acrylate and glycidyl methacrylate, or by means of silane-functional comonomers.

The polymers can be homopolymers or copolymers. The polymers are preferably copolymers.

If one or more comonomers are also used in the free-radical polymerization of the glycidol-based macromonomer (s), the proportion of units of the glycidol-based macromonomer (s) in the copolymer formed is preferably from 1 to 60 mol %, preferably from 2 to 30 mol %, very particularly preferably from 2 to 15 mol %, of macromonomer units, in each case based on the total copolymer.

Preparation of Polymers (Free-Radical Polymerization)

The preparation of polymers by free-radical polymerization can be carried out in a manner known to those skilled in the art in organic solvents or in bulk in the presence of free-radical initiators such as peroxides or azo compounds. Possible solvents are, in particular, esters such as ethyl acetate, n-butyl acetate or 1-methoxy-2-propyl acetate and also aromatic solvents such as toluene or xylene and ketones such as methyl isobutyl ketone or methyl ethyl ketone, and also mixtures thereof. The choice of solvent also depends on the later intended use of the polymer. Preference is given to using low-boiling solvents in order to make it easier to distil off the solvents in the case of applications in which the polymers are used as 100% strength product, e.g. in UV-curing coating systems or in polymers.

The free-radical polymerization is carried out at temperatures of from about 40° C. to 180° C., preferably from 60° C. to 150° C., particularly preferably from 80° C. to 130° C.

The free-radical polymerization can be carried out as a continuous or batch process.

The free-radical polymerization can be carried out, for example, as a bulk polymerization, as a solution polymerization, as a precipitation polymerization, as an emulsion polymerization or as a suspension polymerization.

The free-radical polymerization can be carried out as an uncontrolled free-radical polymerization or as a controlled free-radical polymerization.

Methods of controlled free-radical polymerization allow better defined polymer architectures having a narrower molecular weight distribution to be achieved. It is possible to use the methods of controlled free-radical polymerization which are known to those skilled in the art, for example ATPR (atom transfer radical polymerization), GTP (group transfer polymerization), NMP (nitroxide mediated polymerization), RAFT (reversible addition fragmentation chain transfer process) or MADIX (macromolecular design via the interchange of xanthates).

Controlled polymerization processes include, in particular, the "reversible addition fragmentation chain transfer process" (RAFT), which is also referred to as "MADIX" (macromolecular design via the interchange of xanthates) and "addition fragmentation chain transfer" when using particular polymerization regulators. RAFT is described, for example, in Polym. Int. 2000, 49, 993, Aust. J. Chem 2005, 58, 379, J. Polym. Sci. Part A: Polym. Chem. 2005, 43, 5347, Chem. Lett. 1993, 22, 1089, J. Polym. Sci., Part A 1989, 27, 1741 and 1991, 29, 1053 and 1993, 31, 1551 and 1994, 32, 2745 and 1996, 34, 95 and 2003, 41, 645 and 2004, 42, 597 and 2004, 42, 6021 and also in Macromol. Rapid Commun. 2003, 24, 197 and in U.S. Pat. No. 6,291,620, WO 98/01478, WO 98/58974 and WO 99/31144.

A further process for controlled polymerization makes use of nitroxyl compounds as polymerization regulators (NMP) and is disclosed, for example, in Chem. Rev. 2001, 101, 3661.

Another controlled polymerization process is "group transfer polymerization" (GTP), as described, for example, by O. W. Webster in "Group Transfer Polymerization", in "Encyclopedia of Polymer Science and Engineering", Volume 7, H. F. Mark, N. M. Bikales, C. G. Overberger and G. Menges, Eds., Wiley Interscience, New York 1987, page 580 ff., and in O. W. Webster, Adv. Polym. Sci. 2004, 167, 1-34.

Controlled free-radical polymerization using tetra-phenylethane, as described, for example, in Macromol. Symp. 1996, 111, 63, is a further example of controlled polymerization.

Controlled free-radical polymerization using 1,1-diphenylethene as polymerization regulator is described, for example, in Macromolecular Rapid Communications 2001, 22, 700.

Controlled free-radical polymerization using iniferters is disclosed, for example, in Makromol. Chem. Rapid. Commun. 1982, 3, 127.

Controlled free-radical polymerization using organo-cobalt complexes is known, for example, from J. Am. Chem. Soc. 1994, 116, 7973, from Journal of Polymer Science: Part A: Polymer Chemistry, Vol. 38, 1753-1766 (2000), from Chem. Rev. 2001, 101, 36113659 and from *Macromolecules* 2006, 39, 8219-8222.

A further controlled polymerization technique is degenerative chain transfer using iodine compounds as described, for example, in Macromolecules 2008, 41, 6261 or in U.S. Pat. No. 7,034,085.

Controlled free-radical polymerization in the presence of thioketones is described, for example, in Chem. Commun., 2006, 835-837 and in Macromol. Rapid Commun. 2007, 28, 746-753.

The polymer can be a homopolymer or a copolymer. Copolymers can be random copolymers, block copolymers or gradient copolymers and may be made up of two or more, hydrophilic and/or hydrophobic monomers.

The number average molecular weight of the polymers is in the range from 1500 to 200 000, preferably from 5000 to 75 000, particularly preferably in the range from 7500 to 50 000. The number average molecular weight of the polymers is determined by gel permeation chromatography.

To influence the number average molecular weight and the molecular weight distribution of the polymers, it is possible to use suitable control or chain transfer reagents. Examples include thiols such as n-octyl mercaptan, n-dodecyl mercaptan or t-dodecyl mercaptan and dimers of alpha-methylstyrene. For example, it is possible to use small amounts of bifunctional monomers (e.g. hexanediol diacrylate) in the polymerization in order to increase the molecular weight in a targeted manner.

The polymers can be subsequently modified by means of polymer-analogous reactions. For example, the after-reaction with maleic anhydride enables a reactive double bond and an acid function to be incorporated. This acid function can also, for example, be converted into a salt by means of triethanolamine to improve the solubility in water. Furthermore, subsequent transesterification with hydroxy-functional (meth) acrylates makes it possible to obtain products which can be incorporated in a fixed manner into surface coating systems even in radiation-curing processes such as UV and electron beam curing. It is also possible to esterify free OH groups by, for example, after-reaction with acetic anhydride in order to be able to avoid potential intermediate layer adhesion problems when the polymers are employed as levelling agents in surface coatings.

Use of the Polymers

The invention further provides for the use of the polymers as additives in coating compositions, plastics or cosmetics.

For the purposes of the present invention, plastics are polymeric moulding compositions and thermoplastics.

For the purposes of the present invention, cosmetics are cosmetic compositions. Cosmetic compositions are materials or preparations composed of materials which are intended to be applied externally on human beings or in the oral cavity of human beings for cleaning, care or influencing appearance or body odour for imparting odour impressions. There is no real distinction between body care products and decorative cosmetics since cleaning and care of the skin also fulfils an aesthetic function and decorative cosmetics generally simultaneously have a protective and care effect. Thus, body care products and decorative cosmetics are encompassed by cosmetic compositions. The cosmetic preparations also include, materials and preparations for cleaning and care of dental prostheses. On the other hand, materials and preparations which are intended predominantly to alleviate or eliminate diseases, maladies, bodily injury or illnesses or influence body shape are not cosmetic compositions.

The polymers can be used, for example, as levelling agents in coating compositions in order to improve, for example, the optical properties of the resulting coating. The use of polymers as levelling agents enables, for example, the levelling, the gloss and/or the opalescence of the coating compositions or coatings or plastics to be improved.

The polymers can, for example, also be used to alter the surface properties of coatings, polymeric moulding compositions and thermoplastics. The addition of the polymers enables the surface energy of coatings, polymeric moulding compositions and thermoplastics to be influenced. The surface can be made more hydrophilic or more hydrophobic, so that adhesion to the surface is improved or else is prevented, as a result of which dirt-repellent, easy-to-clean surfaces can be obtained. In general, increasing the surface energy gives more hydrophilic surfaces which can be wetted more easily and offer better adhesion conditions. On the other hand, reducing the surface energy generally gives more hydrophobic surfaces which are more difficult to wet and have dirt-repellent, non-stick properties.

Polymers which are suitable for increasing the surface energy can be obtained, for example, by polymerization of comparatively hydrophilic macromonomers (e.g. on the basis of ethoxylated macromonomers) or by copolymerization with rather hydrophilic comonomers (e.g. hydrophilic acrylates such as polyethylene glycol (meth)acrylates or (meth) acrylic acid). Polymers which are suitable for reducing the surface energy can be obtained, for example, by polymerization of comparatively hydrophobic macromonomers (e.g. on the basis of propoxylated macromonomers) or by copolymerization with rather hydrophobic or particularly suitable comonomers, for example comonomers containing perfluoro groups and/or polysiloxane groups.

Additives for Obtaining Dirt-Repellent, Non-Stick Surfaces

The copolymers which can be added to coating compositions, polymeric moulding compositions and thermoplastics and whose addition enables dirt-repellent, easy-to-clean, non-stick surfaces to be achieved can be prepared, for example, by polymerization of at least one macromonomer or copolymerization of at least one macromonomer and a least one comonomer, for example a comonomer containing perfluoro groups and/or polysiloxane groups.

Coating compositions, polymeric moulding compositions and thermoplastics to which appropriate comonomers are added have excellent non-stick and dirt-repellent properties. The copolymers also have no significant adverse effect on the other properties of the coating compositions or coatings, polymeric moulding compositions or thermoplastics. These copolymers can be added in relatively small amounts (additive amounts) to the coating compositions, polymeric moulding compositions or thermoplastics. Particularly in coating compositions and plastics such as polymeric moulding compositions and thermoplastics, the polymers can preferably also be used in relatively small amounts of from 0.01 to 5% by weight, preferably from 0.05 to 2% by weight and particularly preferably from 0.1 to 1% by weight, in each case based on the total coating composition or the total plastic.

The physical properties of the original coating compositions or coatings, polymeric moulding compositions and thermoplastics, for example in respect of corrosion protection, maintenance of gloss and weathering resistance, are not adversely affected by the small concentrations of the additive. Coating compositions or coatings, polymeric moulding compositions and thermoplastics containing the copolymers generally display the desired properties over a period of a number of years and continue to retain these properties even over a number of cleaning cycles.

Furthermore, it has been found to be particularly advantageous that the hydroxyl groups of the glycidol-based macromonomer units in the polymers can be crosslinked with reactive groups of the binder and thus ensure a permanent effect.

The use of the polymers and additives in coating compositions, polymeric moulding compositions or thermoplastics also enable surfaces having non-stick properties or antifouling properties to be obtained.

Additives for Achieving Readily Wettable Surfaces

Coatings, polymeric moulding compositions and thermoplastics to which appropriate comonomers are added have highly wettable surfaces. The wettability can be determined by determining the contact angle of the surface towards water using customary methods. For hydrophilic surfaces, the contact angle should be <60°. The copolymers also do not have a significant adverse effect on the other properties of the coating compositions or coatings, polymeric moulding compositions or thermoplastics. These copolymers can be added in relatively small amounts (additive amounts) to the coating compositions, polymeric moulding compositions or thermoplastics, preferably in amounts of from 0.01 to 5% by weight, preferably from 0.05 to 2% by weight and particularly preferably from 0.1 to 1% by weight, in each case based on the total coating composition or the total plastic. The physical properties of the original coating compositions or coatings, polymeric moulding compositions and thermoplastics, for example in respect of corrosion protection, maintenance of gloss and weathering resistance, are not adversely affected by the small concentrations of the additive. Coating compositions or coatings, polymeric moulding compositions and thermoplastics containing the copolymers generally continue to display the desired properties over a period of a number of years and also retain these properties over a number of cleaning cycles.

Furthermore, it has been found to be particularly advantageous that the hydroxyl groups of the glycidol-based macromonomer units in the polymers can be crosslinked with reactive groups of the binder and thus ensure a permanent effect.

Wetting Agents and Dispersants

The polymers can also be used as dispersants in the fields of use for dispersants which are known from the prior art; here, the polymers can be used as dispersants instead of or in combination with the dispersants known from the prior art. Thus, for example, they can be used in the production or processing of surface coatings, printing inks, paper coatings, leather and textile colorants, pastes, pigment concentrates, ceramics or cosmetic preparations, particularly when these contain solids such as pigments and/or fillers. They can also be used in the production or processing of casting and/or moulding compositions based on synthetic, semisynthetic or natural macromolecular materials, for example polyvinyl chloride, saturated or unsaturated polyesters, polyurethanes, polystyrene, polyacrylate, polyamide, epoxy resins, polyolefins such as polyethylene or polypropylene. For example, the copolymers can be used for producing casting compositions, PVC plastisols, gel coats, polymer concrete, circuit boards, industrial surface coatings, surface coatings for wood and furniture, vehicle coatings, ship paints, corrosion protection paints, can and coil coatings, trade paints and paints for buildings, where binders and/or solvents, pigments and if appropriate fillers, the comb polymers and customary additives are mixed. Examples of customary binders are resins based on polyurethane, cellulose nitrate, cellulose acetobutyrate, alkyd, melamine, polyester, chloro rubber, epoxide and acrylate. Examples of water-based coatings are cathodic or anodic electrophoretic coatings, for example for automobile bodies. Further examples are plasters and renders, silicate paints, emulsion paints, water-based paints based on water-dilutable alkyds, alkyd emulsions, hybrid systems, two-component systems, polyurethane dispersions and acrylate dispersions.

The copolymers are also particularly suitable as dispersants for producing concentrates of solids, for example pigment concentrates. For this purpose, the copolymers are, for example, initially placed in a carrier medium such as an organic solvent, plasticizer and/or water and the solids to be dispersed at a added while stirring. These concentrates may additionally contain binders and/or other auxiliaries. However, it is possible, in particular, to produce stable binder-free pigment concentrates using the copolymers. It is likewise passable to produce flowable concentrates from press cakes of pigments using the polymers. Here, the copolymers are mixed into the press cake which can still contain organic solvents, plasticizers and/or water and the mixture obtained in this way is dispersed. The concentrates of solids produced in various ways can then be incorporated into various substrates such as alkyd resins, polyester resins, acrylate resins, polyurethane resins or epoxy resins. However, pigments can also be dispersed directly into the copolymers in the absence of solvents and are then particularly suitable for pigmenting thermoplastic and thermoset polymer formulations.

The copolymers can also be advantageously used in the production of inks for "nonimpact" printing processes such as "thermal inkjet" and the "bubblejet process". These inks can be, for example, aqueous ink formulations, solvent-based ink formulations, solvent-free or low-solvent inks for UV applications and also wax-like inks.

The copolymers can also be used advantageously in the production of colour filters for liquid crystal displays, liquid crystal VDUs, colour resolution instruments, sensors, plasma screens, displays based on SED (surface conduction electron-emitter display) and for MLCC (multilayer ceramic compounds). Here, the liquid colour filter coating composition, also referred to as colour resist, can be applied by a variety of application processes such as spin coating, doctorblade coating, a combination of the two or by "nonimpact" printing processes such as inkjet processes. The MLCC technology is used in the production of microchips and circuit boards.

The copolymers can also be used for producing cosmetic preparations such as makeup, powder, lipsticks, hair colours, creams, nail varnishes and sun protection preparations. These can be present in the usual forms, for example as W/O or O/W emulsions, solutions, gels, creams, lotions or sprays. The copolymers can advantageously be used in dispersions used for producing these preparations. These can contain the carrier media usual for these purposes in cosmetics, for example water, castor oils or silicone oils and solids such as organic and inorganic pigments such as titanium dioxide or iron oxide.

Finally, such a dispersant can also be used for producing a pigmented coating on a substrate, with the pigmented surface coating composition being applied to the substrate and the pigmented surface coating composition applied to the substrate being baked or cured or crosslinked.

The copolymers can be used either alone or together with binders customary in the prior art. When the copolymers are used in polyolefins, it can be advantageous, for example, to use appropriate low molecular weight polyolefins as carrier materials together with the comb copolymer.

Another possible use of the copolymers is the production of dispersible powder particulate and/or fibre particulate solids, in particular dispersible pigments or polymeric fillers, with the particles being coated with the comb copolymer. Such coatings of organic and inorganic solids are carried out in a known way, as described, for example, in EP-A-0 270 126. Here, the solvent or emulsion medium can either be removed or remain in the mixture to form pastes. These pastes are conventional commercial products and can additionally contain binders and also further auxiliaries and additives. Especially in the case of pigments, the coating of the pigment surface can be effected during or after the synthesis of the pigments, e.g. by addition of the copolymers to the pigment suspension or during or after pigment finishing. The pigments which have been pretreated in this way display easier incorporability and also improved viscosity, flocculation and gloss behaviour and higher colour strength compared to untreated pigments.

Examples of pigments are monoazo, diazo, triazo and polyazo pigments, oxazine pigments, dioxazine pigments, thiazine pigments, diketopyrrolopyrroles, phthalocyanines, ultramarine and other metal complex pigments, indigoid pigments, diphenylmethane, triarylmethane, xanthene, acridine, quinacridone and methine pigments, anthraquinone, pyranthrone and perylene pigments and other polycyclic carbonyl pigments. Further examples of organic pigments may be found in the monograph: W. Herbst, K. Hunger "Industrial Organic Pigments", 1997 (publisher: Wiley-VCH, ISBN: 3-527-28836-8). Examples of inorganic pigments are pigments based on carbon black, graphite, zinc, titanium dioxide, zinc oxide, zinc sulphide, zinc phosphate, barium sulphate, lithopone, iron oxide, ultramarine, manganese phosphate, cobalt aluminate, cobalt stannate, cobalt zincate, antimony oxide, antimony sulphide, chromium oxide, zinc chromate, mixed metal oxides based on nickel, bismuth, vanadium, molybdenum, cadmium, titanium, zinc, manganese, cobalt, iron, chromium, antimony, magnesium, aluminium (for example nickel titanium yellow, bismuth vanadate molybdate yellow or chromium titanium yellow). Further examples are given in the monograph: G. Buxbaum "Industrial Inorganic Pigments", 1998 (publisher: Wiley-VCH, ISBN: 3-527-28878-3). Inorganic pigments can also be magnetic pigments based on pure iron, iron oxides and chromium oxides or mixed oxides, metal effect pigments comprising aluminium, zinc, copper or brass and also pearl sheen pigments, fluorescent and phosphorescent luminous pigments. Further examples are nanosize organic or inorganic fillers having particle sizes below 100 nm, e.g. certain types of carbon black or particles consisting of a metal or semimetal oxide or hydroxide, and also particles consisting of mixed metal and/or semimetal oxides or hydroxides. For example, the oxides and/or oxide hydroxides of aluminium, silicon, zinc, titanium, etc., can be employed for producing such extremely finely divided solids. These oxidic or hydroxidic or oxide-hydroxidic particles can be produced by a wide variety of processes such as ion-exchange processes, plasma processes, sol-gel processes, precipitation, comminution (e.g. by milling) or flame hydrolysis, etc. These nanosize solids can also be hybrid particles consisting of an inorganic core and an organic shell, or vice versa.

Examples of pulverulent or fibrous fillers are ones which are made up of pulverulent or fibrous particles of aluminium oxide, aluminium hydroxide, silicon dioxide, kieselguhr, diatomaceous earth, quartz, silica gel, talc, kaolin, mica, perlite, feldspar, ground shale, calcium sulphate, barium sulphate, barium sulphate, calcium carbonate, calcite, dolomite, glass or carbon. Further examples of pigments or fillers may be found, for example, in EP-A-0 270 126. Flame retardants such as aluminium hydroxide or magnesium hydroxide and matting agents such as silicas can likewise be dispersed and stabilized extremely well.

The copolymers can also be used as emulsifier for emulsions. Since emulsions are usually unstable systems which do not form spontaneously but dispersion of the phases in one another is obtained only by shaking, stirring, homogenization or spray processes, emulsifiers are used to stabilize these unstable structures. The use of emulsifiers avoids separation of the phases.

The copolymers can also be used as rheological additives.

The copolymers can also be used as bonding agents.

The polymers can be used in coating compositions, polymeric moulding compositions, thermoplastics or cosmetics in a relatively broad range of amounts from 0.01 to 100% by weight, preferably from 0.05 to 50% by weight, very particularly preferably from 0.1 to 40% by weight, in each case based on the total coating composition, the total plastic or the total cosmetic Especially in coating compositions, plastics (polymeric moulding compositions and thermoplastics) and cosmetics, the polymers can preferably also be used in relatively small amounts of from 0.01 to 5% by weight, preferably from 0.05 to 2% by weight and particularly preferably from 0.1 to 1% by weight, in each case based on the total coating composition, the total plastic or the total cosmetic.

The polymers can be used as solutions, emulsions or as 100% strength materials, depending on the type and method of application of the coating composition, the polymeric moulding composition, the thermoplastic, the cosmetic or the other composition.

The present invention further provides surface coating compositions, pastes and moulding compositions containing the copolymers according to the invention and one or more pigments, organic solvents and/or water and, if appropriate, binders and auxiliaries customary in surface coatings. Furthermore, pigments coated with the copolymers of the invention are provided by the invention.

The invention further provides coating compostions and concentrates of solids, for example pigment concentrates, which contain at least one polymer according to the invention as additive, for example as levelling agent, as additive for achieving a dirt-repellent surface, as wetting agent/dispersant or is bonding agent, The invention further provides polymeric moulding compositions and thermoplastics containing at least one polymer according to the invention as additive, for example as levelling agent, as additive for achieving a dirt-repellent surface, as wetting agent/dispersant or as bonding agent.

The invention further provides surfaces and bodies which have been coated with a coating composition containing at least one polymer according to the invention as additive, for example as levelling agent, as additive for achieving a dirt-repellent surface, as wetting agent/dispersant or as bonding agent.

EXAMPLES

Abbreviations

EEGE Ethoxyethyl glycidyl ether
VBA Vinylbenzyl alcohol
HEMA Hydroxyethyl methacrylate
HEMAm Hydroxyethylmethacrylamide
BA n-Butyl acrylate
EHA 2-Ethylhexyl acrylate
Silaplane FM0721 Polysiloxane-monomethyl acrylate Mw~5000) obtainable from Chisso Corp.
Bisomer MPEG550MA Methoxypolyethylene glycol monomethacrylate (Mw~628) obtainable from Cognis
TEMPO 2,2,6,6-Tetramethyl-1-piperidinyloxy nitroxide
AMBN 2,2'-Azobis(2-methylbutyronitrile)
AIBN 2,2'-Azobis(isobutyronitrile)
DMSO Dimethyl sulphoxide
DMF Dimethyl formamide
DOWANOL PM Monopropylene glycol monomethyl ether (obtainable from Dow Chemical Company)
Amberlyst 15 Strongly acidic cation exchanger (obtainable from Rohm and Haas)

Measurement Methods
DMF-GPC:

Gel permeation chromatography (GPC) using dimethylformamide (DMF) as eluent was carried out at 25° C. using an HPLC pump (Bischoff HPLC Compact Pump), a refractive index detector (Jasco RI-2031plus), an autosampler (Jaso AS-055plus) and PSS GRAM columns (100 Å, 1000 Å, 3000 Å). DMF+1 g/l of LiBr was used as eluent. The elution rate was 1.0 ml/min. Calibration was carried out conventionally using polymethyl methacrylate and polystyrene standards. The number average molecular weight Mn, the weight average molecular weight Mw and the polydispersity Q=Mw/Mn were calculated with the aid of the PSS WinGPC Unity programme.

THF-GPC:

Gel permeation chromatography (GPC) using tetrahydrofuran (THF) as eluent was carried out at 25° C. using an HPLC pump (ERC Model 6420), a refractive index detector (Jasco RI-2031plus), an autosampler (Schambeck S 5200) and MZ SDplus columns (50 Å, 100 Å, 1000 Å, 1000 Å) THF was used as eluent at an elution rate of 1.0 ml/min, BHT (2,6-tert-butyl-4-methylphenol) was used as internal standard. Calibration was carried out conventionally using polymethyl methacrylate and polystyrene standards. The number average molecular weight Mn, the weight average molecular weight Mw and the polydispersity Q=Mw/Mn were calculated with the aid of the PSS WinGPC Unity programme.

THF+AcOH-GPC

Gel permeation chromatography (GPC) was carried out at room temperature using an HPLC pump (Waters Alliance 2690) and a refractive index detector (Waters 410), an autosampler (WATERS 717) and Styragel columns (100 Å, 500 Å, 10 000 Å) The eluent was tetrahydrofuran+1% of acetic acid at a flow rate of ml/min. A conventional calibration was carried out by means of polystyrene standards. The number average molecular weight Mn, the weight average molecular weight Mw and the polydispersity Q=Mw/Mn were calculated by means of the NTeqGPC programme.

NMR Spectroscopy:

NMR measurements were carried out using an NMR instrument (Bruker DPX 300) at 300 MHz ($^1$H) and 75 MHz ($^{13}$C). Deuterated chloroform (CDCl$_3$) and deuterated dimethyl sulphoxide (DMSO-d$_6$) were used as solvents All the reactions described below were carried out under a nitrogen atmosphere.

1. Macromonomers 1.1 Synthesis of Linear VBA-Glycidol Macromonomers 1.1.1 Synthesis of VBA

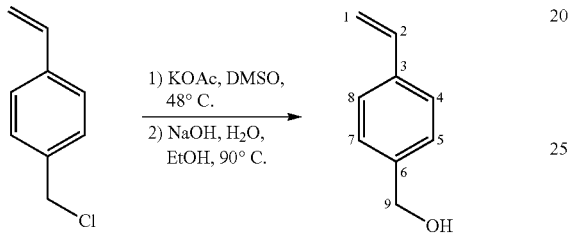

Potassium acetate (11.06 g, 113 mmol), vinylbenzyl chloride (15.0 g, 98 mmol) and hydroquinone (1.5 mg) together with 35 ml DMSO were placed in a reaction vessel and stirred at 40° C. for 48 hours. The mixture was extracted three times with chloroform and the organic phase was dried over Na$_2$SO$_4$. Na$_2$SO$_4$ was filtered off and chloroform was removed under reduced pressure. The residue was added to a mixture of NaOH (7.0 g), water (7 ml), hydroquinone (1.5 mg) and 40 ml of ethanol and heated at the boiling point for 90 minutes. The mixture was extracted three times with chloroform and the organic phase was dried over Na$_2$SO$_4$. Na$_2$SO$_4$ was filtered off and chloroform was removed under reduced pressure. Subsequent purification was carried out by fractional distillation (boiling point 80-90° C. at 1 mbar).

$^1$H-NMR (300 MHz, CDCl$_3$):

δ (ppm)=2.98 (s, 1H, OH), 4.53 (d, 1H, CH$_2$-9), 5.18-5.24 (dd, 1H, CH$_2$-1), 5.67-5.75 (dd, 1H, CH$_2$-1), 6.62-6.72 (m, 1H, CH-2), 7.14-7.34 (m, 4H, CH-4,5,7,8) ppm.

1.1.2 Synthesis of Linear VBA-Glycidol Macromonomers

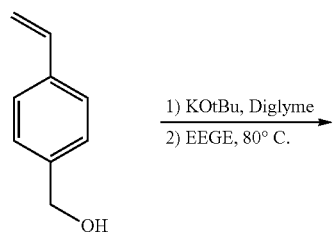

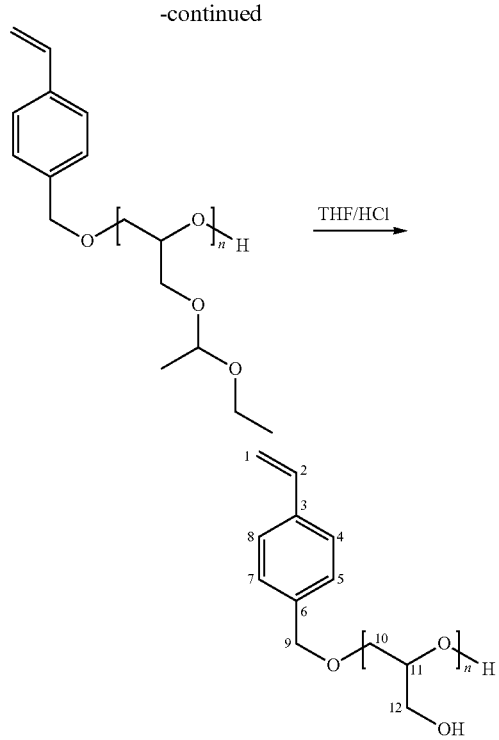

In a baked Schlenk flask, VBA (11.2 g, 83.4 mmol) was dissolved in 80 ml of diglyme and admixed at room temperature with potassium tert-butoxide (KOtBu) (1 M in THF, 16.68 ml, 0.2 eq.). After stirring for 30 minutes, tert-butanol formed was removed under reduced pressure and EEGE (73.15 g, 500.4 mmol) and hydro-quinine (15 mg) were added. After a reaction time of 16 hours at a temperature of 80° C., diglyme was removed under reduced pressure. The macromonomer was obtained as a viscous liquid.

Results according to GPC (THE) and NMR:

| $M_n$ | $M_w$ | $M_w/M_n$ | $P_{n,NMR}$ |
|---|---|---|---|
| 1100 | 1200 | 1.09 | 6.3 |

Removal of the Acetal Protective Group

The macromonomer was dissolved in THF (about 30 ml/1 g of macromonomer) and admixed with concentrated hydrochloric acid (about 1 ml/1 g of polymer) and stirred vigorously for 3 hours. Since the product does not precipitate as a viscous oil, the mixture is neutralized with Na$_2$CO$_3$ and THF is then removed on a rotary evaporator. The residue is taken up in a little methanol and purified by precipitation in diethyl ether. 500 ppm of the inhibitor 2,6-di-tert-butyl-4-methylphenol were added and the solvent was removed under reduced pressure.

$^1$H-NMR (300 MHz, DMSO-d$_6$)

δ (ppm)=3.37-3.58 (m, CH$_2$-10, 12, CH-11), 4.49 (d, CH$_2$-9), 4.84 (s, OH), 5.23-5.29 (dd, CH$_2$-1), 5.79-5.86 (dd, CH$_2$-1), 6.68-6.79 (m, CH-2), 7.23-7.47 (min, CH-4,5,7,8) ppm.

1.2 Synthesis of Linear HEMAm-Glycidol Macromonomers 1.2.1 Synthesis of HEMAm

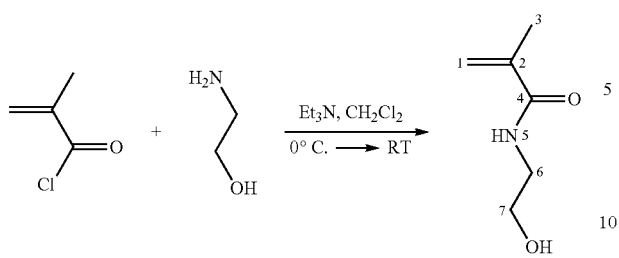

Aminoethanol (25.0 ml, 0.41 mol) and triethylamine (10 ml, 0.13 mol) together with 35 ml of dichloromethane were placed in a reaction vessel and cooled to 0° C. Methacryloyl chloride (20 ml, 0.205 mol) was dissolved in 35 ml of dichloromethane and slowly added dropwise to the first solution. After stirring at 0° C. for three hours, the solution was warmed overnight to room temperature. The precipitated triethylamine hydrochloride was filtered off and dichloromethane was removed under reduced pressure. Purification was carried out by means of column chromatography on silica gel. A mixture of methanol and dichloromethane in a ratio of 20:80 served as eluent.

$^1$H-NMR (300 MHz, CDCl$_3$):

δ (ppm)=1.96 (s, 36, CH$_3$-3), 3.45 (tr, 2H, CH$_2$-7), 3.73 (tr, 2H, CH$_2$-6), 5.35 (s, 1H, CH$_2$-1), 5.74 (s, 1H, CH$_2$-1), 6.75 (s, 1H, NH-5) ppm.

1.2.2 Synthesis of Linear HEMAm-Glycidol Macromonomers

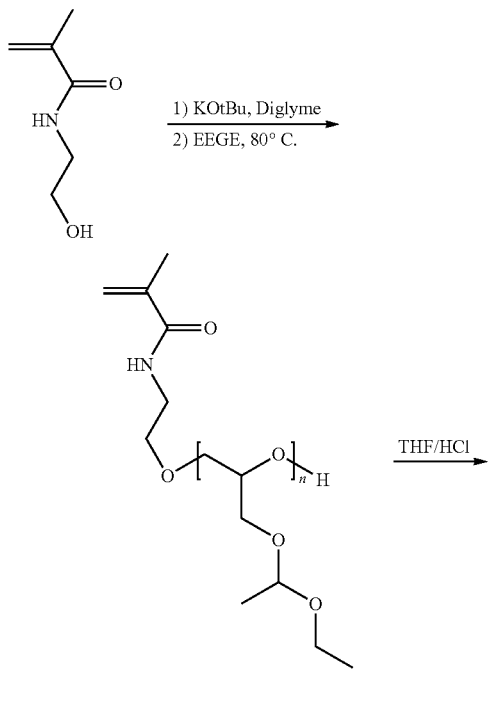

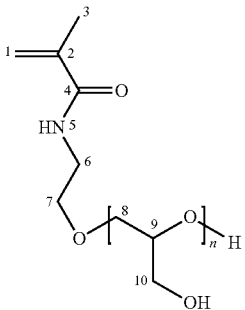

In a baked Schlenk flask, HEMAm (6.93 g, 53.6 mmol) was dissolved in 60 ml of diglyme and admixed at room temperature with potassium tert-butoxide (KOtBu) (1 M in THF, 10.7 ml, 0.2 eq.). After stirring for 30 minutes, tert-butanol formed was removed under reduced pressure and EEGE (47.01 g, 321.6 mmol) and hydroquinone (10 mg) were added. After a reaction time of 18 hours at a temperature of 80° C., diglyme was removed under reduced pressure. The macromonomer was obtained as a viscous liquid.

Results according to GPC (THF) and NMR:

| $M_n$ | $M_w$ | $M_w/M_n$ | $P_{n,NMR}$ |
|---|---|---|---|
| 960 | 1120 | 1.17 | 5.7 |

Removal of the Acetal Protective Group

The macromonomer was dissolved in THF (about 30 ml/1 g of macromonomer) and admixed with concentrated hydrochloric acid (about 1 ml/1 g of polymer) and stirred vigorously for 3 hours, with the product being obtained as a viscous oil. THF was decanted off and the residue was washed a number of times with THF. The product was dissolved in a little methanol and transferred to an appropriate flask. 500 ppm of the inhibitor 2,6-di-tert-butyl-4-methylphenol were added and the solvent was removed under reduced pressure.

$^1$H-NMR (300 MHz, DMSO-d$_6$):

δ (ppm)=1.86 (s, CH$_3$-3), 3.34-3.62 (m, CH$_2$-6,7,8,10, CH-9), 4.72 (s, OH), 4.96 (s, CH$_2$-1), 5.13 (s, CH$_2$-1) ppm.

1.3 Synthesis of Branched VBA-Glycidol Macromonomers

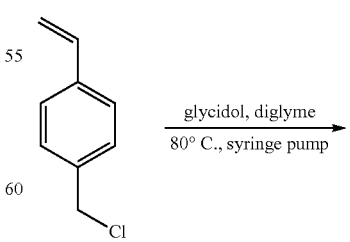

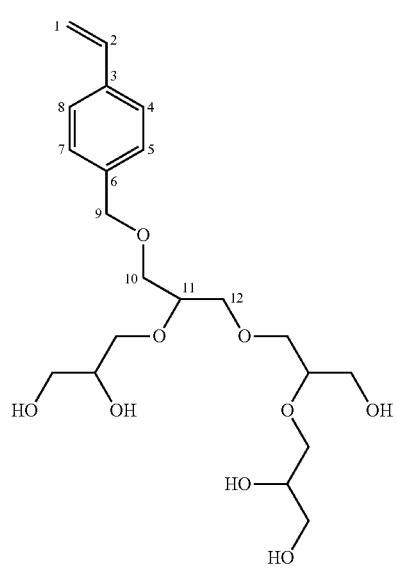

In a baked Schlenk flask, vinylbenzyl alcohol (10.34 g, 77.1 mmol) was dissolved in 50 ml of diglyme, admixed with hydroquinone (10 mg) and admixed at room temperature with potassium tert-butoxide (KOtBu) (1 M in THF, 7.7 ml, 0.1 eq.). After stirring for 30 minutes, tert-butanol formed was removed under reduced pressure. The reaction was started at a temperature of 80° C. Glycidol (22.85 g, 308.4 mmol) was added slowly at a rate of 4 ml/h by means of a syringe pump. After a reaction time of 16 hours, diglyme was removed under reduced pressure. The residue was taken up in methanol and Amberlyst 15 was added. After stirring for 4 hours, the ion exchanger was filtered off and methanol was removed under reduced pressure. The macromonomer was obtained as a viscous liquid.

$^1$H-NMR (300 MHz, DMSO-d$_6$)

δ (ppm)=3.34-3.78 (m, CH$_2$-10, 12, CH-11), 3.81-4.30 (br s, OH), 4.49 (d, CH$_2$-9), 5.20-5.27 (dd, CH$_2$-1), 5.77-5.85 (dd, CH$_2$-1), 6.67-6.77 (m, CH-2), 7.28-7.47 (m, CH-4,5,7,8) ppm.

Results According to GPC (DMF):

| $M_n$ | $M_w$ | $M_w/M_n$ |
|---|---|---|
| 950 | 1900 | 2.00 |

1.4 Synthesis of Branched HEMAm-Glycidol Macromonomers

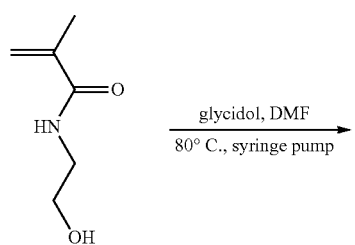

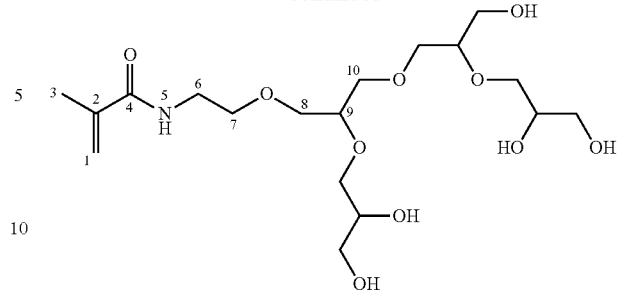

In a baked Schlenk flask, HEMAm (0.553 g, 4.25 mmol) was dissolved in 5 ml of DMF, admixed with hydroquinone (2 mg) and admixed at room temperature with potassium tert-butoxide (1 M in THF, 0.85 ml, 0.2 eq.). After stirring for 30 minutes, tert-butanol formed was removed under reduced pressure. The reaction was started at a temperature of 80° C. Glycidol (1.259 g, 17 mmol) was added slowly at a rate of 0.4 ml/h by means of a syringe pump. After a reaction time of 16 hours, diglyme was removed under reduced pressure. The residue was taken up in methanol and Amberlyst 15 was added. After stirring for 4 hours, the ion exchanger was filtered off and methanol was removed under reduced pressure. The macromonomer was obtained as a viscous liquid.

$^1$H-NMR (300 MHz, DMSO-d$_6$):

δ (ppm)=1.85 (s, 3H, CH$_3$-3) 3.33-3.79 (m, CH$_2$-6,7,8,10, CH-9), 3.81-4.30 (br s, OH), 5.33 (s, 18, CH-1), 5.65 (s, 1H, CH-1), 7.96 (s, 1H, NH-5) ppm.

Results According to GPC (DMF):

| $M_n$ | $M_w$ | $M_w/M_n$ |
|---|---|---|
| 700 | 950 | 1.34 |

2. Polymers 2.1 Synthesis of Copolymers of Linear HEMAm-Glycidol Macromonomers and BA In a baked Schlenk flask, 0.288 g of HEMAm-glycidol macromonomer from Example 1.2.2 and 0.266 g of BA were dissolved in 10 ml of DMF under a nitrogen atmosphere. 21 mg of AIBN were added and the solution was degassed by means of three freeze-thaw cycles. After a reaction time of 18 hours at a temperature of 80° C., DMF was removed under reduced pressure.

Results According to GPC (DMF):

| $M_n$ | $M_w$ | $M_w/M_n$ |
|---|---|---|
| 1000 | 2000 | 1.93 |

2.2 Synthesis of Copolymers of Linear HEMAm-Glycidol Macromonomers and EHA

In a baked Schlenk flask, 0.288 g of HEMAm-glycidol macromonomer from Example 1.2.2 and 0.383 g of EHA were dissolved in 5 ml of DMF under a nitrogen atmosphere. 13 mg of AIBN were added and the solution was degassed by means of three freeze-thaw cycles. After a reaction time of 18 hours at a temperature of 100° C., DMF was removed under reduced pressure.

Results According to GPC (DMF):

| $M_n$ | $M_w$ | $M_w/M_n$ |
|---|---|---|
| 1700 | 3700 | 2.29 |

2.3 Synthesis of Copolymers of Branched VBA-Glycidol Macromonomers and Styrene 1.2 g of VBA-glycidol macromonomer from Example 1.3 and 1.2 g of styrene together with 5 ml of DMF were placed under a nitrogen atmosphere in a baked Schlenk flask. After addition of 37.5 mg of TEMPO and 39.4 mg of AIBN, the reaction mixture was degassed by means of three freeze-thaw cycles. The reaction solution was stirred at 130° C. for 72 hours. After removal of DMF under reduced pressure, the product was isolated as a brownish highly viscous substance.

$^1$H-NMR (300 MHz, DMF-d$_7$):

δ (ppm)=0.81-2.42 (m, 6H. CH-2, 8, CH$_2$-1,7), 3.30-4.15 (m, 20H, CH$_2$-14, 16, CH-15), 4.38-5.10 (m, 2-8, CH$_2$-13, OH), 6.32-7.51 (m, 9H, CH-4,5,6,10,11) ppm.

Results According to GPC (DMF):

| $M_n$ | $M_w$ | $M_w/M_n$ |
|---|---|---|
| 4400 | 5700 | 1.27 |

2.4 Synthesis of Copolymers of Branched VBA-Glycidol Macromonomers, EHA and Silaplane FM-0721

16.62 g of VBA-glycidol macromonomer from Example 1.3 and 115 g of Dowanol PM are placed in a glass flask provided with stirrer, thermometer, distillation attachment, dropping funnel and nitrogen inlet tube. Nitrogen was passed over the reaction mixture during the entire reaction. After increasing the reaction temperature to 110° C., a mixture of 1.48 g of AMBN, 1.83 g of α-methylstyrene dimer, 37.95 g of EHA and 65.43 g of Silaplane FM-0721 is metered in at a uniform rate over a period of 210 minutes. After the addition is complete, the reaction temperature is maintained at 110° C. for another 180 minutes.

0.2 g of AMBN is then added. After the addition is complete, the reaction temperature is maintained at 110° C. for another 180 minutes. The solvent used is then distilled off under reduced pressure on a rotary evaporator.

Results According to GPC (THF+AcOH):

| $M_n$ | $M_w$ | $M_w/M_n$ |
|---|---|---|
| 3259 | 10 865 | 3.33 |

2.5 Synthesis of Copolymers of Branched VBA-Glycidol Macromonomers, BA and Silaplane FM-0721

18.40 g of VBA-glycidol macromonomer from Example 1.3 and 115 g of Dowanol PM are placed in a glass flask provided with stirrer, thermometer, distillation attachment, dropping funnel and nitrogen inlet tube. Nitrogen is passed over the reaction mixture during the entire reaction. After increasing the reaction temperature to 110° C., a mixture of 1.64 g of AMBN, 2.02 g of α-methylstyrene dimer, 29.18 g of BA and 72.43 g of Silaplane FM-0721 is metered in at a uniform rate over a period of 210 minutes. After the addition is complete, the reaction temperature is maintained at 110° C. for another 180 minutes.

0.27 g of AMBN is then added. After the addition is complete, the reaction temperature is maintained at 110° C. for another 180 minutes. The solvent used is then distilled off under reduced pressure on a rotary evaporator.

Results According to GPC (THF+AcOH):

| $M_n$ | $M_w$ | $M_w/M_n$ |
|---|---|---|
| 3114 | 11 930 | 3.83 |

2.6 Synthesis of Copolymers of Branched HEMAm-Glycidol Macromonomers, EHA, Bisomer MPEG550MA and Silaplane FM-0721

76 g of Dowanol PM are placed in a glass flask provided with stirrer, thermometer distillation attachment, dropping funnel and nitrogen inlet tube. Nitrogen is passed over the reaction mixture during the entire reaction. After increasing the reaction temperature to 110° C., a mixture of 1.79 of AMBN, 2.21 g of α-methylstyrene dimer, 38.98 g of EHA, 31.63 g of Silaplane FM-0721 and a mixture of 20.09 g of HEMAm-glycidol macromonomer from Example 1.4, 29.30 g of Bisomer MPEG550MA are metered in simultaneously and at a uniform rate over a period of 180 minutes. After the addition is complete, the reaction temperature is maintained at 110° C. for another 120 minutes.

0.3 g of AMBN is then added. After the addition is complete, the reaction temperature is maintained at 110° C. for another 120 minutes. The solvent used is then distilled off under reduced pressure on a rotary evaporator.

Results According to GPC (THF+AcOH):

| $M_n$ | $M_w$ | $M_w/M_n$ |
|---|---|---|
| 4705 | 13 208 | 2.80 |

3. Comparative Example

Synthesis of Branched HEMA-glycidol Macromonomers (Reaction as Described by W. F. Hoskyns (Research Disclosure 174, 32-33 (1978))

Glycidol (8.88 g, 120 mmol) was placed in a baked Schlenk flask and heated to 150° C. A mixture of KOH (20 mg), hydroquinone (130 mg) and HEMA (2.6 g, mmol) was added to the glycidol over a period of 2 hours by means of a syringe pump. The reaction mixture was stirred at 150° C. for a further 2 hours. The product is obtained as a viscous brownish substance. However, polymer particles which are not soluble in the main fraction are formed during the reaction. These can also not be redissolved after the reaction.

4. Use Examples

Dirt-Repellent Surfaces and Levelling

Test system: Acrylate-melamine baking enamel, clear Composition (Figures in Parts by Weight):

| | |
|---|---|
| Setalux 1760 VB 64 | 44.0 |
| Setalux C 91389 VX 45 | 16.5 |
| Luwipal 018 | 25.3 |
| Butyl diglycol acetate | 2.1 |
| Solvesso 150 | 4.8 |

| | |
|---|---|
| Butanol | 6.1 |
| Butyl diglycol | 1.2 | are mixed, and

| | |
|---|---|
| Butanol | 8.0 |
| Solvesso 150 | 3.8 |
| Butyl diglycol | 1.8 | are then added.

Setalux 1760 VB 64=acrylate baking enamel resin, Nuplex Resins, Bergen op Zoom
Setalux C 91389 VX 45=acrylate baking enamel resin, Nuplex Resins, Bergen op Zoom
Luwipal 018=melamine baking enamel resin, BASF AG, Ludwigshafen The polymers (polymer from Example 24, polymer from Example 2.5, polymer from Example 2.6 or no additive, as per the table below) were incorporated one day before application. The amount added was 0.15% by weight, based on the total mixture.

On the day of application, the viscosity was set to 24 seconds, DIN 4 mm orifice cup (23° C.), by means of Solvesso 150. Application was carried out by means of spraying robots. After air drying for 30 minutes, curing was carried out at 140° C. for 30 minutes. The layer thickness was 20 μm.

The resulting surface coatings are tested as follows.

Achievement of Dirt-Repellent Surfaces

The surface coatings obtained are assessed in respect of their dirt-, water- and oil-repellent action according to the following criteria:

Visual Assessment of the Surface of the Coating:
The surface of the coating is examined for turbidity in the film and surface defects such as craters, specks and incompatibilities.
Evaluation: 1-5
1=coating surface without surface defects
5=coating surface with craters/specks Edding Test:
An "Edding 400" permanent marker is used to write on the coating surface and a visual assessment is made as to whether the surface can be written on. Whether the ink spreads on the surface or contracts together is assessed. After the ink has dried, an attempt is made to wipe it off by means of a dry cloth.
Evaluation: 1-5
1=ink contracts together and can be removed by means of a paper tissue without leaving a residue
5=ink spreads very well on the substrate and is virtually impossible to remove Bitumen Test:
Bitumen is heated until it is sufficiently liquid to be able to be applied to the surface of the coating. After cooling of the mass, a visual assessment is made as to how well the bitumen mass can be removed manually from the surface again without leaving a residue.
Evaluation: 1-5:
1=bitumen can be removed easily without leaving a residue
5=bitumen adheres strongly to the surface and is virtually impossible to remove Water Runoff Test:
A drop of water is placed on the surface. The coated surface of the coating is subsequently tilted until the drop runs off. The angle at which the drop runs off and whether the drop runs off without leaving a residue is assessed visually.
Evaluation: 1-5:
1=low angle is sufficient and the drop runs off completely without "nose formation" and without residual droplets
5=coated metal sheet has to be inclined strongly until the drop runs off; residues of water may remain on the surface of the coating Mineral Oil Runoff Test:
A drop of commercial mineral oil is placed on the surface of the coating the coated substrate is subsequently tilted until the drop has run about 10 cm. After 5 minutes the oil track or a newly formed drop is evaluated visually.
Evaluation: 1-5:
1=the oil track immediately forms individual drops again
5=the oil track does not reform but instead may spread further The results obtained are shown in the following table.

| | Surface Visual | Edding | Bitumen | Water runoff | Mineral oil runoff |
|---|---|---|---|---|---|
| Control (without additive) | 4 | 5 | 5 | 5 | 5 |
| Polymer from Example 2.4 | 2 | 1 | 1 | 1 | 1 |
| Polymer from Example 2.5 | 2 | 1 | 1 | 1 | 1 |
| Polymer from Example 2.6 | I | 1 | I | 1 | 1 |

The results show that a surface which repels dirt, oil and water very well can be achieved when using the polymers of the invention as additives.

Use of the Polymers as Levelling Agents

Levelling was determined by means of the wave-scan DOI instrument from Byk-Gardner by measuring the long wave, the short wave and the value for DOI (distinctness of image). Gloss and haze were determined using the haze-gloss instrument from Byk-Gardner.

| | Long wave | Short wave | DOI | Gloss R20 | Haze |
|---|---|---|---|---|---|
| Control (without additive) | 58 | 64 | 73 | 89 | 76 |
| Polymer from Example 2.4 | 5 | 35 | 87 | 95 | 16 |
| Polymer from Example 2.5 | 9 | 38 | 86 | 96 | 15 |
| Polymer from Example 2.6 | 5 | 30 | 89 | 96 | 13 |

The results show that improved results in respect of levelling, gloss and haze are achieved when using the polymers of the invention as levelling agents than when no levelling agent is used.

The invention claimed is:
1. A process for preparing a macromonomer, wherein
(A) a starting compound U—OH, where
U—O— is a radical of the general formula (II)

wherein $R^2$ is H or a linear or branched alkyl radical having from 1 to 4 carbon atoms, and
$R^3$ is a linear alkylene, a branched alkylene or an aralkylene radical, which has from 1 to 20 carbon atoms and can contain one or more hydroxy groups, is partially deprotonated by addition of an alkali metal hydroxide or an alkoxide with formation of water or alcohol so as to form a mixture of protonated (U—OH) and deprotonated (U—O$^{(-)}$) molecules of the starting compound, (B) the water formed or the alcohol formed is then substantially removed from the reaction mixture and (C) the mixture of protonated (U—OH) and deprotonated (U—O$^{(-)}$) molecules of the starting compound is subsequently reacted with at least one oxirane compound of the formula (III)

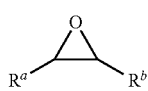
(III)

where $R^a$ is hydrogen, methyl, ethyl, n-propyl, isopropyl, n-butyl, isobutyl, sec-butyl or tert-butyl, and $R^b$ is a linear or branched alkyl radical having from 1 to 6 carbon atoms and at least one hydroxy group which can optionally be etherified with a protective group, where the molar ratio of the amounts used $n_{(starting\ compound)}:n_{(oxirane\ compound)}$ is in the range from 1:100 to 1:1.

2. The process according to claim 1, wherein in the general formula (II) $R^2$=H or $CH_3$ and $R^3$=ethyl or propyl.

3. The process according to claim 2, wherein $R^2$=$CH_3$ and $R^3$=ethyl.

4. The process of claim 1, wherein step (C) further comprises reacting the mixture of protonated (U—OH) and deprotonated (U—O$^{(-)}$) molecules of the starting compound with at least one alkylene oxide.

5. The process according to claim 4, wherein the at least one alkylene oxide is selected from the group consisting of ethylene oxide, propylene oxide, butylene oxide, pentylene oxide and hexylene oxide and the ratio of the molar amounts used $[n_{(oxirane\ compound)}+n_{(alkylene\ oxide)}]:n_{(starting\ compound)}$ is in the range from 100:1 to 2:1.

* * * * *